(12) United States Patent
Hatfield

(10) Patent No.: US 6,243,076 B1
(45) Date of Patent: Jun. 5, 2001

(54) SYSTEM AND METHOD FOR CONTROLLING HOST SYSTEM INTERFACE WITH POINT-OF-INTEREST DATA

(75) Inventor: Franz Hatfield, McLean, VA (US)

(73) Assignee: Synthetic Environments, Inc., McLean, VA (US)

( * ) Notice: Subject to any disclaimer, the term of this patent is extended or adjusted under 35 U.S.C. 154(b) by 0 days.

(21) Appl. No.: 09/145,159

(22) Filed: Sep. 1, 1998

(51) Int. Cl.$^7$ ..................................................... C09G 5/00
(52) U.S. Cl. ......................... 345/156; 345/121; 345/158; 345/473; 345/977
(58) Field of Search ..................................... 345/156, 157, 345/158, 173, 121, 123, 126, 333, 334, 347, 348, 473, 474, 977, 7

(56) References Cited

U.S. PATENT DOCUMENTS

| | | | |
|---|---|---|---|
| 4,891,630 | 1/1990 | Friedman et al. | 345/156 |
| 5,068,645 | 11/1991 | Drumm | 340/710 |

(List continued on next page.)

FOREIGN PATENT DOCUMENTS

WO 86/03863   7/1996  (WO) .

OTHER PUBLICATIONS

Muneo Iida et al., "Gaze Point Detection System Allowing Head Motion," Systems and Computers in Japan, vol. 23, No. 6, 1992, pp. 85–93.

Robert J.K. Jacob, "The Use of Eye Movements in Human–Computer Interaction Techniques: What You Look At Is What You Get," ACM Transactions on Information Systems, vol. 9, No. 3, Apr. 1991, pp. 152–169.

PCT International Search Report, PCT/US 99/18751, Dated Mar. 17, 2000.

Nielsen, Jakob, "Noncommand User Interfaces," Communications of the ACM, vol. 36, No. 4, Apr., 1993, pp. 83–99.

Bolt, Richard, A., The Human Interface: Where People and Computers Meet, Table of Contents, Lifetime Learning, London, 1984.

Calhoun et al., Gloria L., "Eye–Controlled Switching for Crew Station Design", Proceedings of the Human Factors Society, 28th Annual Meeting, 1984.

Borah, Joshua, "Helmet Mounted Eye Tracking for Virtual Panoramic Display Systems, vol. I & ll: Eye Tracker Specification and Design Approach," Final Report, AAMR-L–TR–89–019, AAMRL, WPAFB, OH, 1989.

(List continued on next page.)

*Primary Examiner*—Dennis-Doon Chow
(74) *Attorney, Agent, or Firm*—Finnegan, Henderson, Farabow, Garrett & Dunner, L.L.P.

(57) ABSTRACT

A system and method are disclosed for a user interface control that utilizes one or more graphical objects ("comets"), which can be operated solely by the eye gaze of a user. The disclosed system and method enables users to access and control, for example, computer displays without use of hands, voice or other forms of input. Each comet may be implemented as an animated graphic object that is mapped to one or more computer functions (a command set) by a computer or software application programmer. A computer-based system may create one or more comets on a display device and place them in motion. Eye tracking data may be collected over a period of time based on the detected point-of-gaze of a user's eye. If the user is determined to be visually tacking a particular comet, the comet will become selected and the computer or host system may execute the command set that has been mapped to the selected comet. The disclosed system and method may also be adapted to determine a user's point-of-interest based on the movement of an input device (such as a conventional mouse, trackball, data glove, etc.) and to select a comet based on a correspondence between the movement of the comet and the movement of the input device.

24 Claims, 12 Drawing Sheets

U.S. PATENT DOCUMENTS

| | | | |
|---|---|---|---|
| 5,142,655 | 8/1992 | Drumm | 379/52 |
| 5,287,119 | 2/1994 | Drumm | 345/158 |
| 5,305,244 | 4/1994 | Newman et al. | 364/708.1 |
| 5,367,315 | 11/1994 | Pan | 345/156 |
| 5,377,303 | 12/1994 | Firman | 395/2.84 |
| 5,426,450 | 6/1995 | Drumm | 345/168 |
| 5,450,596 | 9/1995 | Felsenstein | 395/800 |
| 5,471,542 | 11/1995 | Ragland | 382/128 |
| 5,600,765 | 2/1997 | Ando et al. | 395/133 |
| 5,625,380 | 4/1997 | Hansen | 345/157 |
| 5,632,002 | 5/1997 | Hashimoto et al. | 392/2.4 |
| 5,664,061 | 9/1997 | Andreshak et al. | 704/275 |
| 5,689,619 | 11/1997 | Smyth | 395/10 |
| 5,731,805 | 3/1998 | Tognazzini | 345/156 |

OTHER PUBLICATIONS

Jacob, Robert J.K., "The Use of Eye Movements in Human–Computer Interaction Techniques: What You Look At is What you Get," *ACM Transactions on Information Systems*, vol. 9, No. 3, Apr. 1991, pp. 152–169.

Hatfield et al., Franz, "Eye/Voice Mission Planning Interface," Published as Armstrong Laboratory Tech. Report, AL/CF–TR–1995–0204, Synthetic Environments, Inc. McLean, VA, Dec. 1995.

Hatfield et al., Franz, "Principles and Guidelines for the Design of Eye/Voice Interaction Dialogs," published as part of the $3^{rd}$ Annual Symposium on Human Interaction with Complex Systems, IEEE Computer Society, Aug. 25–28, 1996, pp. 10–19.

Calhoun et al., Gloria, "Eye Line–of–sight Control Compared to Manual Selection of Discrete Switches (U)," Published as Armstrong Laboratory Tech. Report, AL–TR–1991–0015, Apr. 1991.

Wahlster, Wolfgang, "User and Discourse Models for Multimodal Communications," *Intelligent User Interfaces*, Chapter 3, ACM Press, 1991, pp. 45–67.

Koons et al., David B., "Integrating Simultaneous Input from Speech, Gaze, and Hand Gestures," *Intelligent Multimedia Interfaces*, Chapter 11, AAAI Press/The MIT Press, 1993, pp. 257–276.

"Technology Review: Eye Tracking," *VR News*, vol. 5, Issue 10, Dec. 1996, pp. 30–32.

A comet head can be any shape, 2D or 3D

A single track can hold multiple comet heads

SYSTEM AND METHOD FOR CONTROLLING HOST SYSTEM INTERFACE WITH POINT-OF-INTEREST DATA

STATEMENT REGARDING FEDERALLY SPONSORED RESEARCH OR DEVELOPMENT

This invention was made with Government support under Contract No. F41624-96-C-6036, awarded by the Department of the Air Force, Air Force Material Command. The Government has retained certain rights in the invention, including the right in limited circumstances to require the patent owner to license others on reasonable terms.

BACKGROUND OF THE INVENTION

1. Field of the Invention

The present invention generally relates to the field of human-computer interaction and user interface technology. More particularly, the present invention relates to a system and method that determines a user's intent or choice by comparing, for example, the user's eye motion response resulting from a computer or software generated and presented animation sequence stimulus.

2. Background Information

Human-computer interaction (HCI) is concerned with ways that humans and computers can communicate to cooperatively solve problems. HCI technology has improved dramatically since the first digital computers equipped with teletype terminals. Users first communicated with early computers through command-based text entry, and primarily through a keyboard. The introduction of the graphical user interface, the so-called Windows-Icons-Menus-Pointing (WIMP) model, introduced a spatial dimension to user interfaces and a new style of interaction, which allowed use of a "mouse" pointing device to identify objects and windows that are intended as the target of the communication, and a small set of commands, e.g., mouse clicks, that could convey a particular meaning (e.g., open this window, start this program, or get the help information on this item). In each case, the meaning of the mouse click is interpreted in the context of what user interface object or objects the mouse is currently positioned over. Today's interfaces are called "graphical user interfaces" because they replace much of the prior text-based communication between the human and the computer, with graphical objects that are capable of conveying information and accepting input to accomplish similar results that were previously accomplished by text-based methods. Nevertheless, all these approaches are "command-based," with an explicit dialog occurring between the user and the computer wherein the user issues commands to the computer to do something. In contrast, non-command-based interfaces (see, for example, NIELSEN, Jakob, "Noncommand User Interfaces," *Communications of the ACM*, Vol. 36, No. 1, January, 1993, pp. 83–99) passively monitor the user, collecting data, such as the recent history of interactions, head position, eye gaze position, and others so that they may better characterize the user's problem solving context, and be in a position to offer automated support that is finely focused on the current problem context. For example, if a computer program has information on what user interface object the user is currently looking at, the program can offer more detailed information about the subject represented by that object (see, for example, TOGNAZZINI, U.S. Pat. No. 5,731,805).

Current computer systems provide users a limited range of input device choices. In addition to the keyboard, personal computers and workstations invariably come equipped from the manufacturer with some kind of pointing device such as a mouse device. Users may purchase other pointing devices from a variety of third party vendors. These other pointing devices include remote mice, trackballs, forceballs, light pens, touch screen panels, and more exotic hardware like head pointing and gesture devices (e.g., data gloves). All these devices can produce output that is suitable for controlling a cursor on the screen. Alternatively, users may obtain speech recognition software that reduces or virtually eliminates the need for any kind of pointing device or keyboard.

Interacting with a command-based graphical user interface usually involves a two step process. First, a user interface object must obtain the "focus" and second, the user must provide "consent" so that the computer can perform the action associated with the user interface object. This process may be referred to as the "focus-consent" interaction style. For example, pushing a button user interface control (object) involves first positioning the mouse cursor over the button, and then pressing the left mouse button down while maintaining the mouse cursor over the button's spatial extent. In command line (text-based) interfaces, the focus and consent are provided by typing in the desired application program or operating system commands and pressing the enter key. Effectively, the user is specifying what he/she wants the computer to do, and reviewing it for correctness before pressing the enter key.

Eye point-of-gaze (POG) was proposed for use in controlling an interface as early as the 1970's (see, for example, BOLT, Richard A., *The Human Interface: Where People and Computers Meet*, Lifetime Learning, London, 1984). In its early conceptualization, a computer user would fixate a particular area on a computer display, and after holding his gaze there for some set period of time (i.e., a dwell period), the computer would respond appropriately. For example, if the user stares at the letter "A" for more than say 0.5 seconds, it is considered to be "selected" and the computer might respond by typing an "A" into a text entry box. An application of this method would be an eye-gaze activated keyboard, which would be particularly useful for people who cannot or do not wish to use a conventional keyboard. Eye point-of-gaze has also been proposed for use in aviation displays to reduce manual workload (see, for example, CALHOUN et al., Gloria L., "Eye-Controlled Switching for Crew Station Design," *Proceedings of the Human Factors Society*, 28th Annual Meeting, 1984; BORAH, Joshua, "Helmet Mounted Eye Tracking for Virtual Panoramic Display Systems, Volumes I & II: Eye Tracker Specification and Design Approach," Final Report., AAMRL-TR-89-019, AAMRL, WPAFB, OH, 1989), for control of head-mounted displays (see, for example, SMYTH, U.S. Pat. No. 5,689,619), and for general purpose computer use (see, for example, JACOB, Robert J. K., "The Use of Eye Movements in Human-Computer Interaction Techniques: What You Look At is What You Get," *ACM Transactions on Information Systems*, Vol. 9, No. 3, April, 1991, pp. 152–169; HATFIELD et al., Franz, "Eye/Voice Mission Planning Interface," published as Armstrong Laboratory Tech. Report AL/CF-TR-1995-0204, Synthetic Environments, Inc., McLean, Va., 1995).

Performance Constraints Imposed by the Human Visual System

The human visual system produces several different types of eye movement which are summarized in BORAH. In scanning a visual scene, a subject's eye movement typically consists of a series of stops at visual targets, called fixations, and rapid jumps between targets, called saccades. Visual information is acquired primarily during fixations, which typically last at least 200 milliseconds. Saccades last from 30 to 120 milliseconds and reach velocities of 400 to 600 degrees per second. During fixations, the eyes exhibit several types of involuntary motion, including microsaccades (also called flicks), drifts and tremor. Microsaccades, the source of the greatest movement, serve the purpose of re-centering an image on the fovea. This involuntary motion is usually less than one degree of visual angle, but is important for the design of eye-tracking systems and user interfaces that make use of eye-tracking input. Because of this involuntary motion, if a user is attempting to fixate a visual target that is located close to another target, it may be difficult for the eye-tracking system to adequately discriminate which target is intended, simply because the observed phenomenon—involuntary eye motion—cannot be controlled. Given both the inherent behavior of the human visual system, and the accuracy of currently engineered eye-tracking systems, users may be required to stare at the intended target sufficiently long so that the eye-tracking system can disambiguate the intended target. This is usually accomplished by some kind of averaging process, so that the centroid of observations over some period of time gives a reasonable estimate of what the user is fixating. One way to alleviate the staring burden on the user is to make visual targets larger, but this has the negative effect of requiring additional display space. In aviation applications, as an example, display space is scarce and comes at a premium. The prospects for achieving better discrimination of stationary targets with better eye-tracking accuracy are not promising, since the accuracy levels of current art systems are already at about 0.5 degrees of visual angle. Since the involuntary motion of the eye may approach 1.0 degree as discussed above, current system accuracy levels are already working within the performance envelope of the human visual system.

As further disclosed herein, the present invention entails setting a computer-generated graphical object into motion, a form of computer animation. Animation has been used in computer interfaces primarily to convey information to the user, rather than as a device for eliciting information from the user. Animation has been used to impart understanding and maintain user interest, as well as providing entertainment value. Animation has been used to draw interest to a particular item on a computer display, after which the user is expected to undertake some overt action with an input device. For example, video games use animation to stimulate a response from a player, e.g., shooting at a target. But the user input stimulated is not to express a choice or necessarily control what happens next in the game, but to give the user the opportunity to show and/or improve his/her skill and enable the user to derive enjoyment from the contest. Animation has not been directly used as a means for eliciting choice information from the user.

Problems in Using Eye Gaze in An Interface

There are several problems in conventional systems with using eye-gaze to control a computer interface. First, the current art relies on extended, unnatural dwell times in order to cause a user interface object to gain focus. Second, in current art, if a user succeeds in causing a user interface object to gain the focus, some other form of input is required to provide consent. While the consent may be provided by eye blink, or by requiring an even greater dwell period over the focal user interface object, this is difficult and unnatural.

When a computer user moves the cursor over a graphical user interface object, the user has nominally four (4) different actions that could be accomplished with a two button mouse, and six (6) different actions that could be accomplished with a three button mouse, allowing both single and double clicks. The number goes up higher if chorded keys are allowed, e.g., clicking the left mouse button while holding the control key down. However, when eye point-of-gaze is used alone, the range of expressions that are possible, compared to a mouse, is relatively limited. Simply by detecting that a user is fixating an object, it may not be clear what the user's intent or selection is. Presumably, one could map the length of dwell time into a small set of actions to obtain some discrimination. For example, if the user maintains point-of-gaze for 0.5 seconds, action 1 would be inferred; for 0.5 to 1.0 seconds, action 2 would be inferred; and for dwell times greater than 1.0 seconds, action 3 would be inferred. The main problem with this method is that it is difficult for humans to control their point-of-gaze with any accuracy for even these relatively short periods of time. In addition, in tasks requiring high performance and possibly parallel operations (e.g., speech and visual tasks), the cognitive effort required to maintain point-of-gaze reduces the time available to devote to other tasks, e.g., scanning other areas of the display, performing manual actions or formulating speech responses. As a result of these limitations, when eye gaze is used in an interface, it is usually desirable, if not absolutely necessary, to include some other input modality, e.g., eye blink, voice, switch, or key press input to complete the dialog with the computer (see, for example, HATFIELD et al.; CALHOUN et al.; JACOB; SMYTH).

SUMMARY OF THE INVENTION

As further disclosed herein, the present invention provides users with an alternative means for controlling and inputting information into a computer. The invention provides a way for the computer to monitor the user's eye movement, compare that eye movement to the known movement of a computer generated animated graphical object, and to determine what functions the user wishes to perform, and finally to perform those functions.

The present invention utilizes a user interface control, called a "comet", that is sensitive to a user's eye gaze. It relies on setting into motion (i.e., animating) a graphical object on the display that can be visually acquired by the user. The invention can be used to operate a user interface using eye gaze alone. The user visually acquires and tracks one of the comets, and after a short period of time, the computer, by comparing the known track of the comet and the detected motion track of the user's eye gaze, determines that the user wishes to accomplish the action, or set of actions, associated with the comet. The process of visually acquiring a comet to gain focus also provides consent, thereby collapsing two functions (focus and consent) into one action. Unlike other eye gaze interface concepts, no separate manual action or eye blink is required to complete the dialog interaction.

A plurality of comets may be set into motion giving rise to an array of comets. If there is only one object in motion, visually acquiring it and causing it to be selected will result in the computer performing exactly one set of actions. If there are a plurality of objects in motion, say n objects, then depending on which object is visually acquired and selected, the computer will perform the set of actions associated with that object. Hence, with n objects in motion at any given time, the interface effectively provides a menu with n choices.

The invention addresses prior art problems in using eye gaze in an interface by: (i) replacing unnatural and difficult eye fixation tasks with more natural and easier to perform smooth pursuit (target following) eye movement tasks; (ii) combining interaction focus and consent steps in a single unified action; and (iii) presenting a plurality of comets moving in different tracks and/or directions and/or phases, thus allowing a plurality of choices to be presented in a relatively compact display area.

A basic principle underlying the present invention is that, while eye-tracking technology and the human visual system are likely performing close to theoretical limits for stationary targets, by placing visual targets in motion, the unwanted, involuntary motion of the eye becomes of no consequence. This is because when the eye and target are both in motion, the noise in the data signal (statistical variance) can be reduced with good system design. In addition, the eye does particularly well at smoothly tracking targets that are moving in the range of 1 to 30 degrees of visual angle per second, a form of movement that is called smooth pursuit. Smooth pursuit is difficult for humans to do in the absence of a moving target, though training can help. Hence, to take advantage in a computer interface of the well-behaved pattern of smooth pursuit, the user interface controls of the invention are placed into motion (i.e., they are animated).

One aspect of the invention is a computer controlled method for displaying one or more animated computer graphic objects to a computer user. The computer is connected to an external eye tracking system, or otherwise has its own hardware devices and software that allows it to acquire the user's point-of-gaze. The hardware and software is capable of determining the user's point-of-gaze on the computer display device. The computer controlled method displays one or a plurality of animated computer graphic objects on the display, compares the track of the user's point-of-gaze to the known tracks of the various graphic objects, and then determines which object is being tracked by the user. After an arbitrary period of time during which the user's point-of-gaze track and the graphic object tracks are compared, and subject to various conditions on the goodness-of-fit of the user's track to the known tracks of the various objects, it is determined when an adequate match is made. It will then perform, without further input from the user, the action associated with the object whose track best fits that of the user's point-of-gaze track.

In another aspect of the invention, an information presentation system is disclosed having a central processing unit, memory, external storage devices and media, input/output interfaces, a display device, and hardware, software and/or firmware capable of determining the user's point-of-gaze on the display device. The software that determines the user's point-of-gaze on the display may reside on the external storage media, and operate within a process space of the central processing unit, or it can reside on a separate, self contained eye-tracking system that connects to the central processing unit and memory through an input/output interface. The apparatus includes a display device that is capable of displaying one or a plurality of animated graphic objects on the display. The apparatus also includes a point-of-gaze detection process that determines the point in three dimension space at which the user's line-of-gaze (a line drawn from the user's eye to the screen display) intersects the viewable screen plane of the display device. The apparatus also includes a process for determining what user interface objects are intersected by the user's point-of-gaze, including those objects (i.e., comets) that are animated to move in a predetermined track and respond when selected.

The invention also includes a computer program product having computer readable code, implementing algorithms, embodied in a computer usable storage medium. Based on data provided by the eye-tracking hardware and software, the computer readable code determines where the user is looking on the display device and determines the intersection of the user's point-of-gaze with graphic objects shown on the display screen. The computer readable code, implementing an algorithm, then continuously compares the tracks of the graphic objects with the track of the user's point-of-gaze to determine which graphic object the user is following. After determining that a good fit is obtained between the user's point-of-gaze and an object's track, the computer readable code then performs the action associated with that object.

According to another aspect of the invention, a system and method are provided for determining a user's point-of-interest based on the movement of an input device (such as a mouse device, trackball, joystick, data glove, etc.). When the direction of movement of a comet is determined to correspond to the direction of movement of the input device, the comet becomes selected and an action or task associated with the selected comet may be performed. Thus, in addition to permitting the selection of comets based on a user's eye gaze, the present invention also permits comets to be selected based on the movement of an arbitrary input device.

Further features and/or variations may be provided in addition to those noted above. For example, the invention may be directed to various combinations and subcombinations of the above-described features and/or combinations and subcombinations of several further features noted below in the detailed description.

The above-listed and other objects, features and advantages of the present invention will be more fully set forth hereinafter.

BRIEF DESCRIPTION OF THE DRAWINGS

The present invention is further described in the detailed description which follows, by reference to the noted plurality of drawings by way of non-limiting examples of preferred embodiments of the present invention, in which like reference numerals represent similar parts throughout the illustrations, and wherein.

DETAILED DESCRIPTION OF THE PREFERRED EMBODIMENTS

Figure 1:
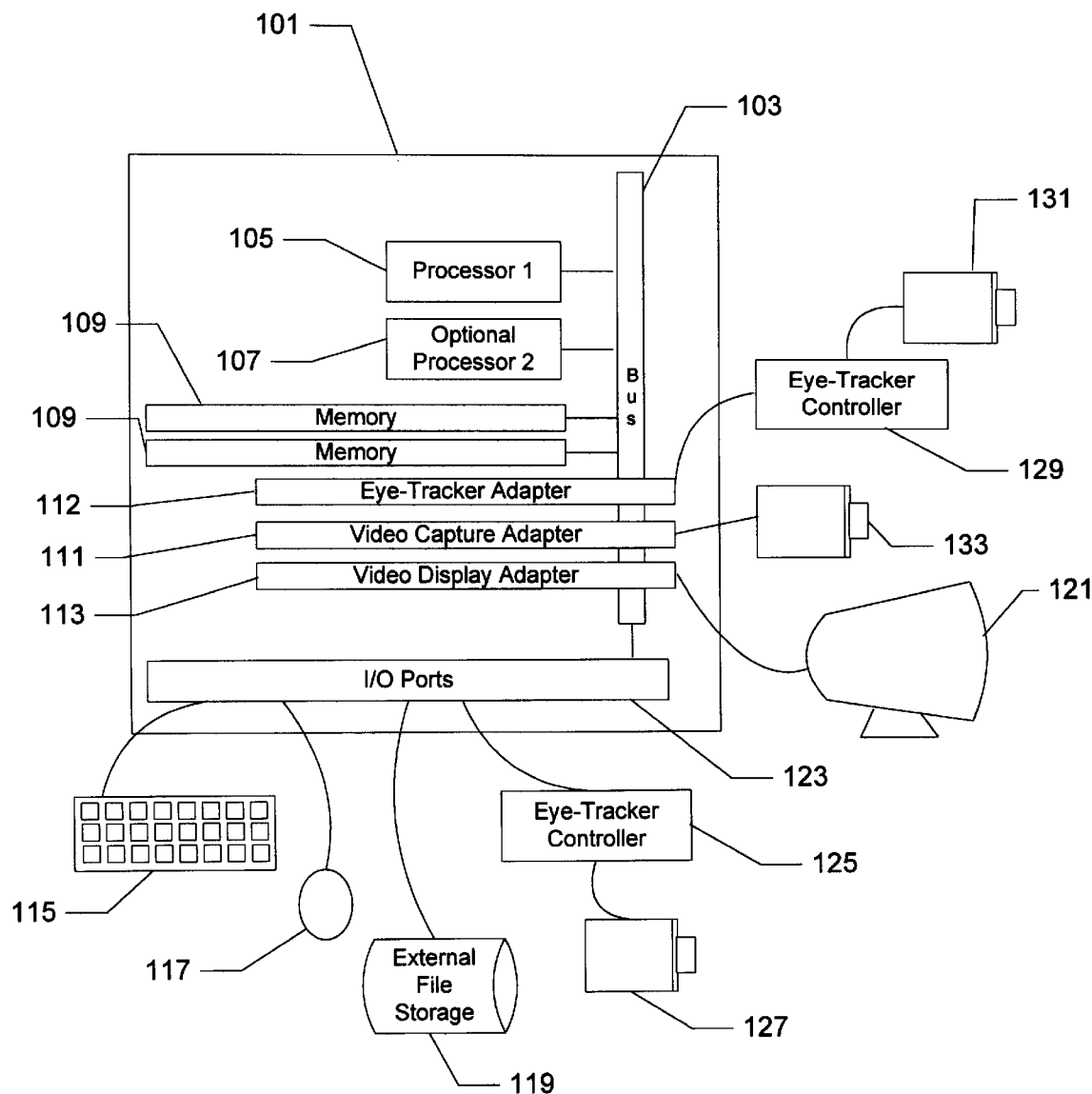
FIG. 1 illustrates an exemplary host computer system environment in which the invention may be embodied.

The present invention is a user interface control that is sensitive to a user's eye gaze. It relies on setting into motion (i.e., animating) one or more graphical objects or comets on the display that can be visually acquired by the user. The invention can be used to operate a user interface, utilizing eye gaze alone. The user visually acquires and tracks one of the comets, and after a short period of time, the computer, by comparing the known track of the comet and the detected motion track of the user's eye gaze, determines that the user wishes to accomplish the action, or set of actions, associated with the comet.

The invention may be applied to various applications and used within a wide variety of operational environments. For example, the invention may be applied to control a computer display, whether mounted on or within a desktop, wall, machinery control panel, vehicle control station, or mounted on the head as part of a wearable computing system. It can be used for control of computer displays in general purpose computing applications, including government, business and at home applications that make use of a graphical user interface. It can be used for controlling Internet Web browsers. The invention can also be used as part of an interface designed to allow persons with certain disabilities to access computing resources without the use of hands, or with minimal use of hands. Further, it can be used as part of an interface for specialized applications including space, aviation, and ground vehicle applications, particularly where users are engaged in operational tasks entailing high cognitive, perceptual and manual workload. It can be used in manned vehicles such as aircraft, helicopters, spacecraft, motorized ground vehicles, and teleoperation of unmanned remote vehicles. It can be used in air traffic control centers, telecommunication centers, including teleconferencing facilities, and other types of command and/or control centers. It can be used in manufacturing process control and other work flow control centers. Moreover, it can be used as part of the interface to simulators and entertainment systems, including virtual reality systems, location-based entertainment systems, and desktop entertainment systems.

One particular application of the invention is to the control of aviation displays in a combat aircraft. In current aircraft, much of the control of displays is accomplished by manual action, either to press buttons on the displays themselves, or to press buttons mounted on the pilot's throttle and stick. For example, if the pilot wishes to re-configure one of the general purpose displays in the aircraft to show an air radar picture rather than the current surface radar picture, the pilot must manually press the correct button or sequence of buttons. By tracking eye point-of-gaze position, and using the features of the invention, many of these control actions can be accomplished by presenting animated graphics, that when acquired and tracked by the eye for a specified period of time, result in specific system responses, e.g., changing the configuration of a display, as described above.

The present invention may be implemented in computer or microprocessor based systems. FIG. 1 illustrates an exemplary host computer system environment in which the invention may be embodied. As shown in FIG. 1, the system consists of a host computer 101, with various input and output devices attached. The host computer 101 may include one or more central processing units 105, 107, internal random access memory 109, a video display adapter 113, and a number of input/output ports 123, all of which are connected through the host computer system bus 103. By way of non-limiting examples, an Intel Pentium-class microprocessor or another type of microprocessor with an operating speed of 200 MHZ or greater may be used for processors 105, 107, and a random access memory with 64 Mb or greater capacity may be used for memories 109. In the embodiment of FIG. 1, keyboard 115 and mouse 117 are exemplary input devices that are connected to the input/output (I/O) ports 123. An external file storage device 119, shown connected to the host computer 101 through the I/O ports 123, may comprise a hard disk, a CD-ROM, and/or any other non-volatile storage media. A video display device 121 is shown connected to the system through the video display adapter 113. The present invention requires a source for eye tracking data, including a video camera. If this source is an external eye tracking system, it can be connected through an input/output port 123. In FIG. 1, a video camera 127 and eye tracker controller 125 are connected to I/O ports 123 and provided as an example of such an eye tracking system. By way of non-limiting example, an ASL Model 4000 or Model 5000 eye tracking system, available from Applied Science Laboratories (Bedford, Mass.), may be utilized as an eye tracking system that is connected to a serial I/O port or I/O ports 123. Alternatively, the eye tracking system or source can be connected through a system bus adapter card 112. For example, a video camera 131 and eye tracker controller 129 are connected to adapter card 112 and may be provided as a supplemental or alternative eye tracking source. By way of a further example, an ISCAN Headhunter, available from ISCAN (Burlington, Mass.), may be utilized as an eye tracking system connected to bus 103 through an adapter card 112. If a system configuration is chosen that does not use an external eye tracker, but performs the eye-tracking controller function within the host computer 101, then such a configuration will require at least a video camera source 133 and a video capture card (or frame grabber) 111. Since the invention accomplishes real-time tracking of the user's point-of-gaze, it is desirable to implement it on an operating system that supports preemptive multi-tasking, and even more desirable, though not required, to implement in on an operating system that supports multiprocessing and on a computer that has multiple processors, such as multiprocessors 105, 107. The software to implement the various features of the invention should use multi-threaded programming to gain the advantages of using a multiprocessor computer architecture. By way of non-limiting examples, Microsoft Visual C++ and Template Graphics Software, Inc. (TGS) Open Inventor may be utilized to implement the various aspects and features of the invention.

Figure 2:
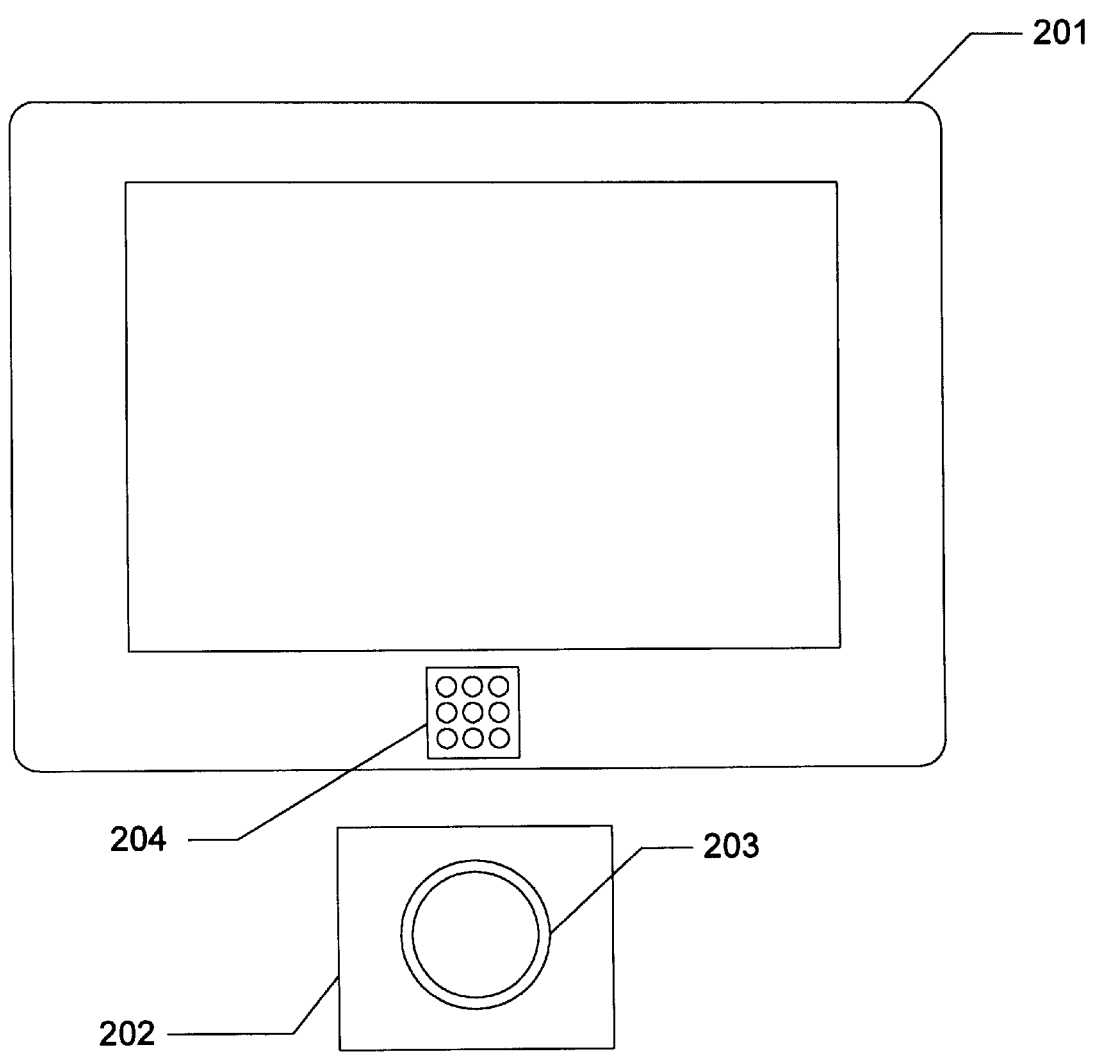
FIG. 2 illustrates an exemplary display device and video camera (with an optional illumination source) for obtaining an image of one or both of the eyes of a user.

As discussed above, the eye tracking system of the invention may be separately connected and/or integrated with the host computer system. By way of example, FIG. 2 illustrates a display device 201 (which could be provided for the display 121 in FIG. 1) and the placement of an enclosure 202 for a video camera 203 and associated mechanical control system (not shown) that controls operations of the video camera (e.g., exposure control, shutter control, pan movement, zoom movement, etc.) in order to obtain an image of one or both eyes of a user. The video camera 203 in FIG. 2 may correspond to any of the video cameras 127, 131, 133 shown in FIG. 1. An optional illumination source 204 is shown in FIG. 2 as being mounted on the display bezel. The illumination source may be comprise one or a plurality of low power infrared (IR) light-emitting-diodes (LEDs) that emit light in the invisible part of the spectrum. When power is applied, the LED array will illuminate the eye without distracting the user, causing one or more noticeable bright spots in the image captured by the video camera 203, provided that it is sensitive in the same IR range as the LEDs.

As discussed above, the present invention utilizes a user interface control, called a "comet", that is sensitive to a user's eye gaze. It relies on setting into motion (i.e., animating) a graphical object on the display that can be visually acquired by the user. The graphical object may comprise a single comet or an array of comets. The user visually acquires and tracks one of the comets, and after a short period of time, the computer, by comparing the known track of the comet and the detected motion track of the user's eye gaze, determines that the user wishes to accomplish the action, or set of actions, associated with the comet. The process of visually acquiring a comet to gain focus provides consent, thereby collapsing two functions (focus and consent) into one action. Unlike other eye gaze interface concepts, no separate manual action or eye blink is required to complete the dialog interaction.

FIGS. 3A–3D illustrate an exemplary sequence of user and computer interaction that invokes and uses a comet array to control the computer. The functionality of the comet can best be understood by first considering how a conventional window-based dialog box is used. For reference, the form that users interact with to open a file in a conventional graphical user interface, is an example of a dialog box. A dialog box may be raised by the program itself or as a result of some other user interaction, e.g., selecting an item from the main menu. Considering the case of the user initiating an action, after the user selects a particular item (e.g., the Open menu item), a form, called a dialog box, is presented for the user to interact with. This dialog box usually comprises a variety of user interface controls and fields, such as drop down list boxes, check boxes, edit fields, and various buttons. After the user fills out the various parts of the dialog, the user presses, for example, an "OK" button. This action causes the computer program to perform some action such as opening a word processing file for editing. A comet may perform in many ways like a regular dialog box. A user program (application) may, on its own initiative, display a comet to get information from the user, or the user may perform some action that results in one or more comets being displayed. Once a comet is displayed, like a dialog box, it waits for the user to dismiss it. If there are multiple comets displayed, the one that is visually acquired first represents the user's choice for a particular action. While the user dismisses a dialog box by first filling out the fields of the dialog and then pressing the OK button, in a comet, the analog of "filling out the fields" is to visually track the comet's movement. Unlike the dialog box, however, the comet may automatically dismiss itself when the program controlling it determines that it has enough information to determine that the user is tracking it. As a result, there is no need for the user to engage in a separate action to dismiss the comet. Further, unlike a conventional dialog box, a comet is an animated graphical object that is set in motion and can be tracked by a user's eye gaze.

Figure 3A:
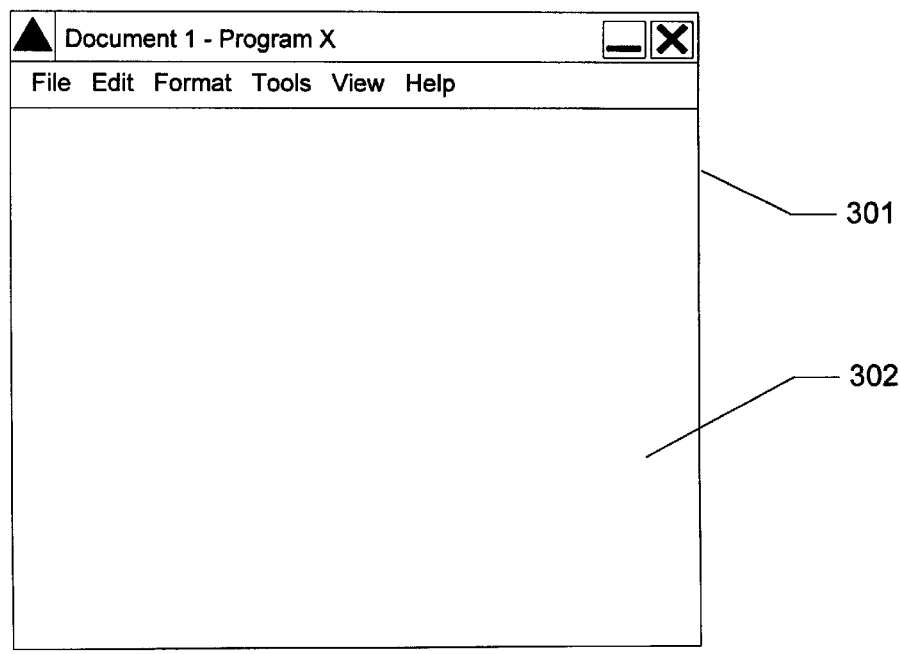
FIGS. 3A, 3B, 3C and 3D illustrate, in accordance with an aspect of the invention, an exemplary sequence of user and computer interaction that invokes and uses a set of comets to control a computer-based system.
Figure 3B:
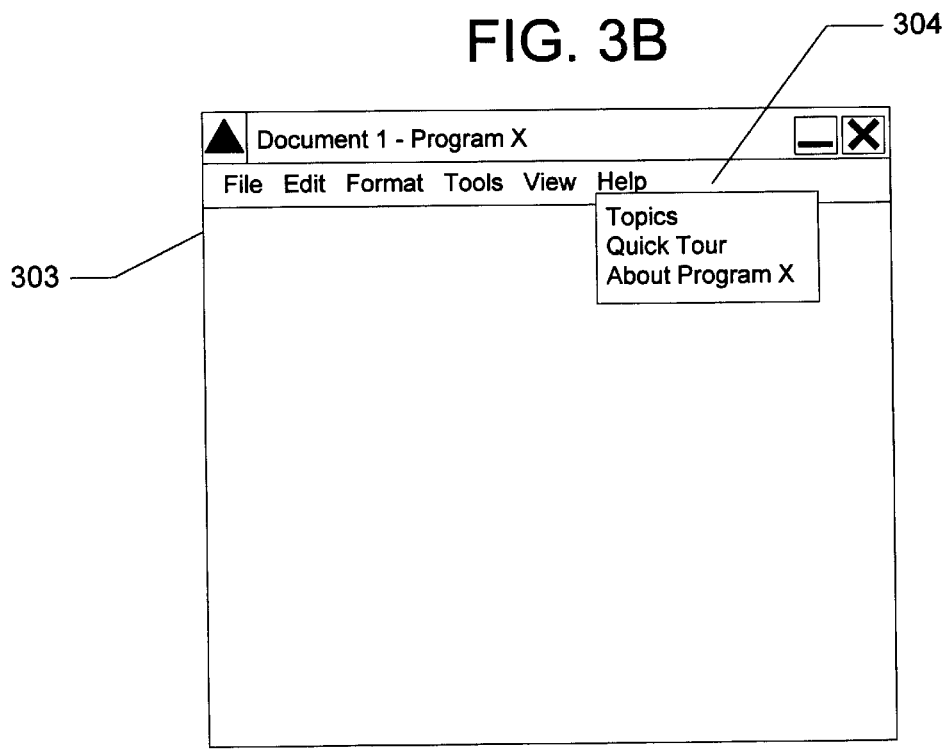
Figure 3C:
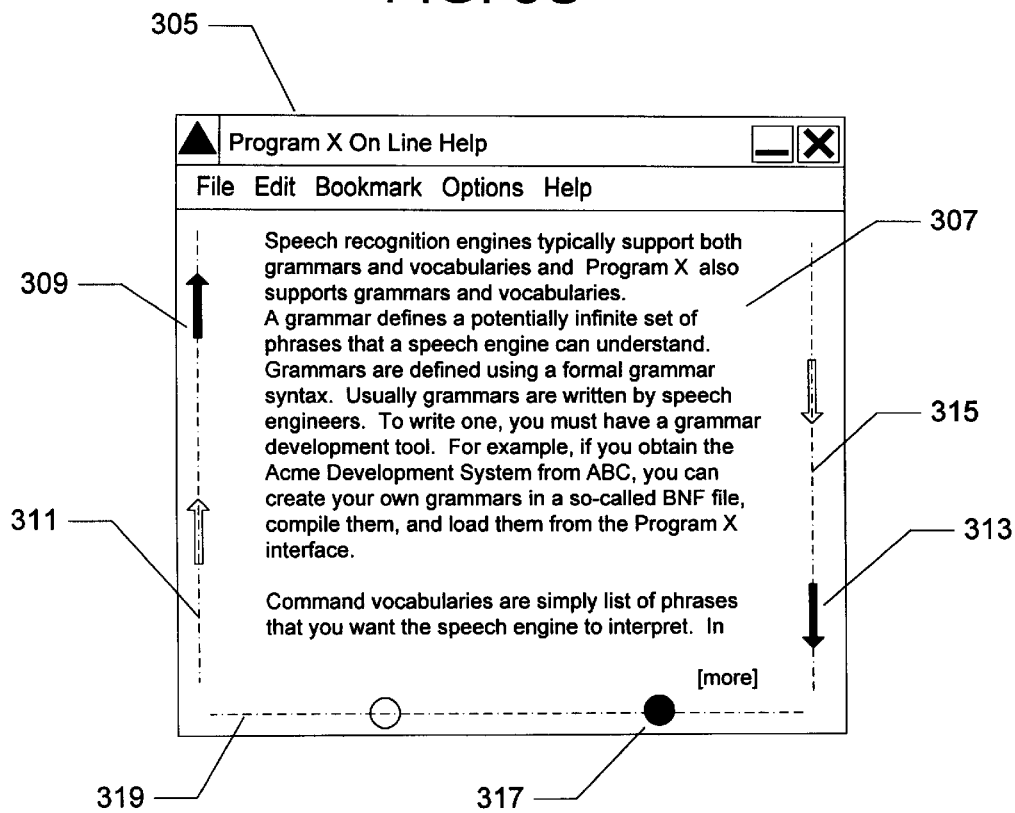
Figure 3D:
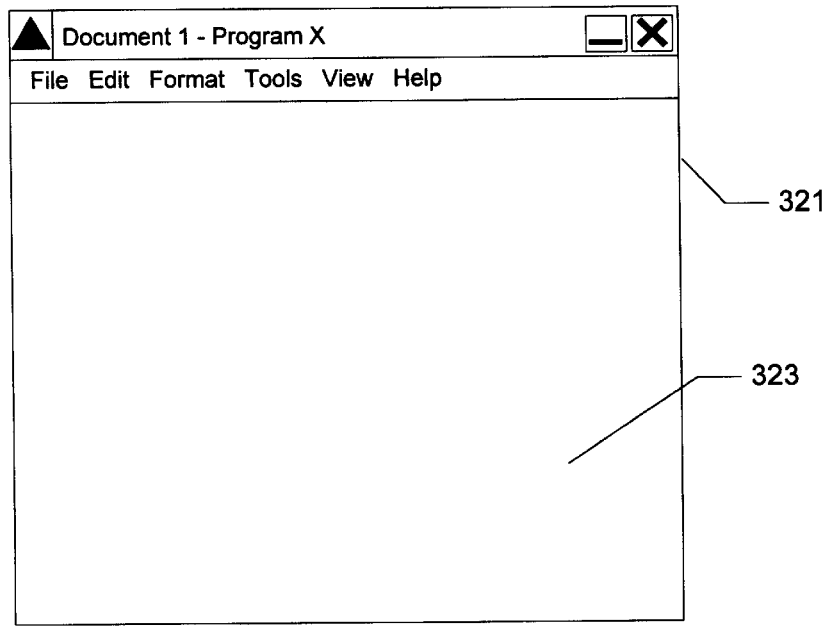

In FIG. 3A, in an initial window display 301, the client area 302 of the running program is blank. In a next window display 303, the user invokes a command to obtain help on a particular topic of interest and selects a menu item from the Help menu 304, as shown in FIG. 3B. A command may be entered by voice, with a keyboard, with a mouse or other pointing device, or any multi-modal combination of the above. In addition, although not illustrated with respect to the embodiment of FIGS. 3A–3B, a command may be selected through the use of a comet or a comet array. In any case, the entry of a command under the Help menu 304 by the user produces a new dialog window or Help page 305 and readable help text 307 with three different comets positioned to the left, right and bottom of the help text display area, as shown in FIG. 3C. The comet 309 displayed at the left of FIG. 3C is a small upward pointing arrow that continuously moves from the bottom of the screen toward the top along a fixed and possibly invisible vertical track 311. When the comet head gets to the top of the screen, it starts over again at the bottom. The comet 313 displayed at the right of FIG. 3C is a small downward pointing arrow that continuously moves from the top of the screen toward the bottom along a fixed and possibly invisible vertical track 315. When the comet head gets to the bottom of the screen, it starts over again at the top. In accordance with an aspect of the invention, the comet 309, when tracked by the user, will result in scrolling the screen up by one full page (equivalent to a Page Up command). A comet 313, when tracked by the user, will result in scrolling the screen down by one full page (equivalent to a Page Down command). A third comet 317, positioned at the bottom of readable text area in FIG. 3C, is a small sphere that may move from left to right along a fixed and possibly invisible horizontal track 319. The comet 317, when tracked by the user, will result in closing the help text display (equivalent to pressing an OK or Close button on a conventional dialog box). Assuming, for example, that the user has visually acquired the comet 317 at the bottom of FIG. 3C to close the dialog, and that the system has correctly interpreted this action, then the program dismisses the Help page 305, and returns to an original appearing program window 321 with a blank client area 323, as illustrated in FIG. 3D.

Figure 4A:
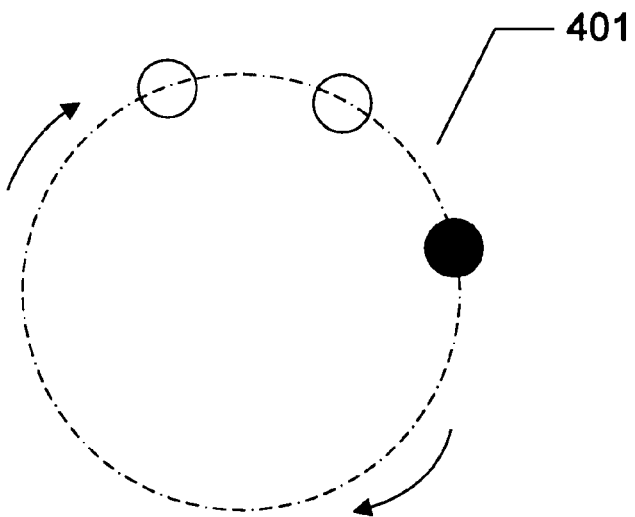
FIGS. 4A, 4B, 4C, 4D, 4E, 4F, 4G, 4H, 4I and 4J illustrate several exemplary embodiments of graphical objects (i.e., comets), in accordance with the invention.
Figure 4B:
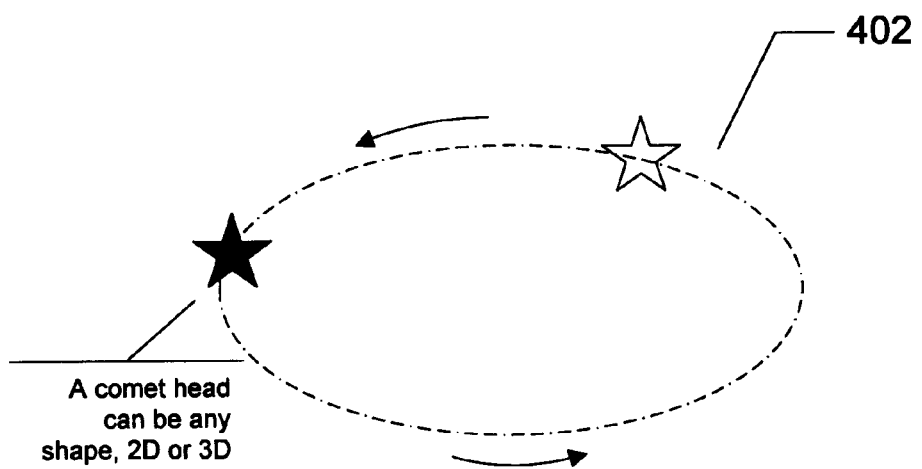
Figure 4C:
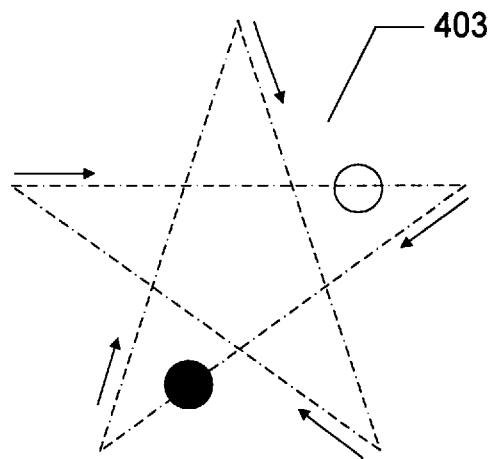
Figure 4D:
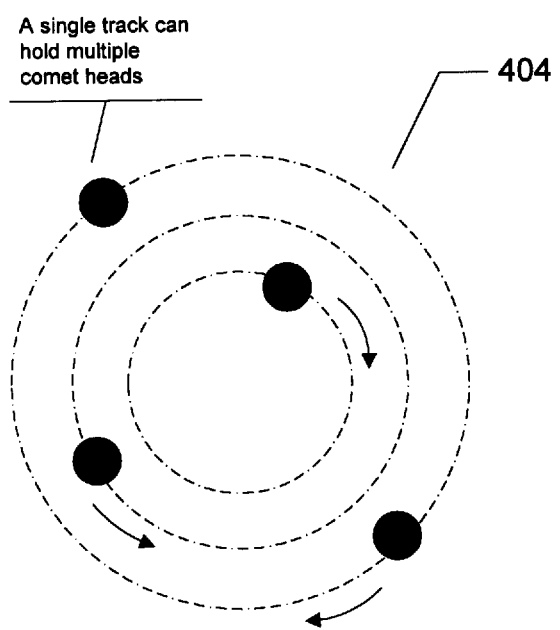
Figure 4E:
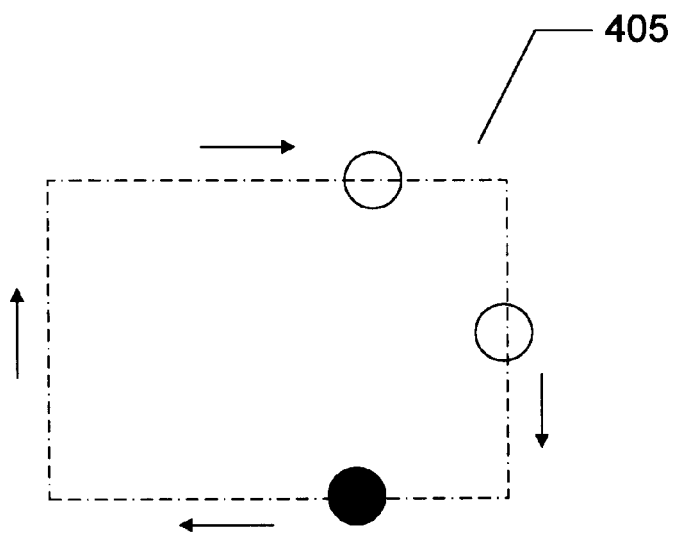
Figure 4F:
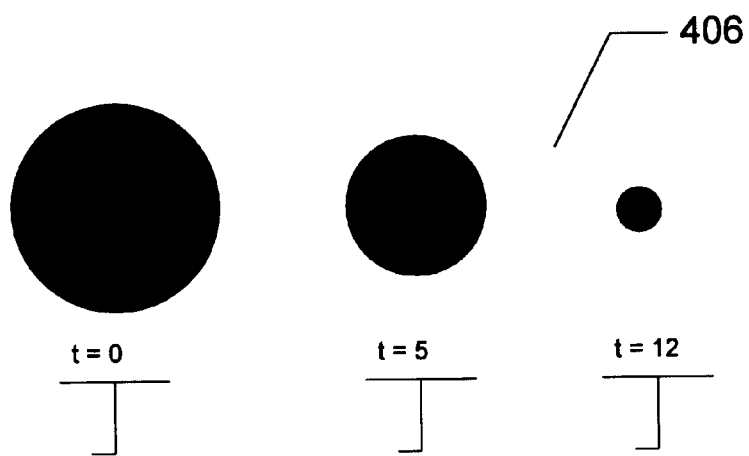
Figure 4G:
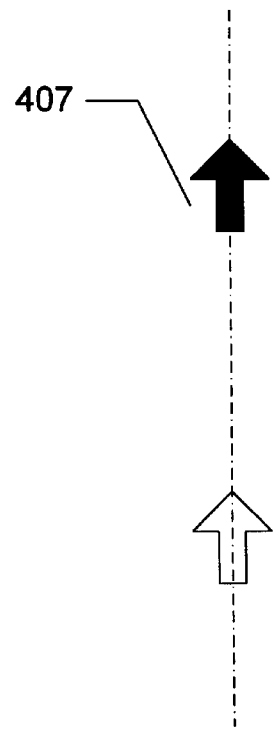
Figure 4H:
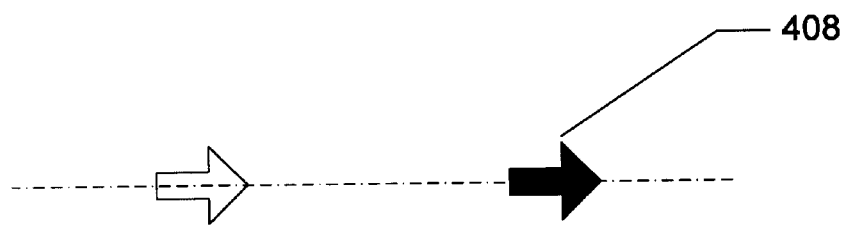
Figure 4I:
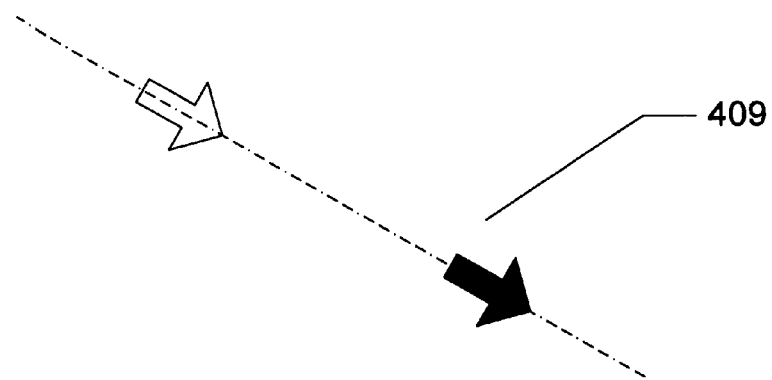
Figure 4J:
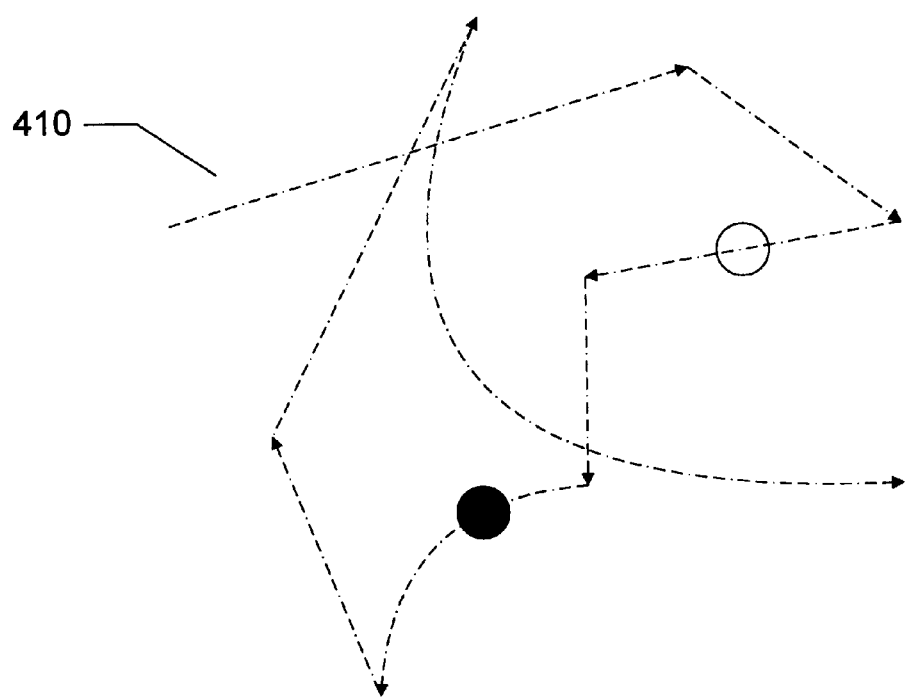

In the embodiment of FIGS. 3A–3D, several exemplary comets 309, 313 and 317 are illustrated. It is of course possible to provide other types of comets and comet arrays to facilitate eye gaze interaction for computer control. Further, comets may be manifested as 2-D or 3-D objects for display to a user. The comets may also appear semi-transparent so as to prevent the blocking of information or text displayed on the screen, yet still be visible to the user. By way of non-limiting examples, FIGS. 4A–4J illustrate several possible visual manifestations of comets and comet arrays. In FIGS. 4A–4J, a dark filled object represents the comet head, and the dashed lines are the tracks that the comets follow. An unfilled object on the same track is used to indicate a prior position of the moving comet. In FIG. 4A, a configuration 401 is provided that illustrates a single comet rotating in a clockwise direction on a circular path. The comet path itself could be displayed, but in most cases should not be displayed because it serves no useful purpose and may clutter the screen. The "head" of the comet is the only part that is actually displayed, so a user only sees a moving 2-D circle or 3-D sphere in the case of configuration 401. The comets can move in their paths at various speeds as determined by the program that controls them. In FIG. 4B, a configuration 402 illustrates a single comet rotating in an elliptical path in a counter-clockwise fashion. Configuration 402 illustrates that a comet head can be of any shape (such as a star shape), material texture or color, whether two dimensional (2-D) or three dimensional (3-D). For example, comets may be implemented as complex, graphical objects or characters and may visually represent things (such as a key or a trash can), animals (such as a frog), or persons (such as a security guard). A configuration 403 of FIG. 4C illustrates a single comet (in this case a sphere or circle) rotating in a star pattern. In FIG. 4D, a configuration 404 illustrates multiple comets rotating in concentric circular paths, and in opposing directions. In the embodiment of FIG. 4D, a single comet track can hold multiple comet heads. In FIG. 4E, a configuration 405 illustrates a single comet rotating in a rectangular path. The path in FIG. 4E could be modified into a square path or any other type of linear path. FIG. 4F illustrates a configuration 406 that comprises three views at successive times of a single comet head that moves into the screen (e.g., along the z-axis), where at each time step (t=0, t=5, t=12), the object becomes smaller. A similar movement could be obtained by having the comet head move out of the screen, where at each time step, the object becomes larger. FIG. 4G illustrates a configuration 407 comprising a comet with an arrow head style moving along a straight line in a vertical direction, while FIG. 4H illustrates a configuration 408 with a similar comet head moving in a horizontal direction. In FIG. 4I, a configuration 409 shows movement along a straight line at an oblique angle. A configuration 410 in FIG. 4J illustrates that, in addition to movement along fixed, repeating paths, a comet can follow a random path whereby it need not ever return to the same place. The use of regular paths is not required but may provide computational advantages, since comet positions can be computed in advance. The comets shown in FIGS. 4A–4J are illustrated as two dimensional (2-D) graphic objects. However, the concept can be implemented using three dimensional (3-D) graphic objects as well (i.e., spheres instead of circles, cubes instead of squares, three dimensional stars instead of two dimensional, etc.).

Figure 5:
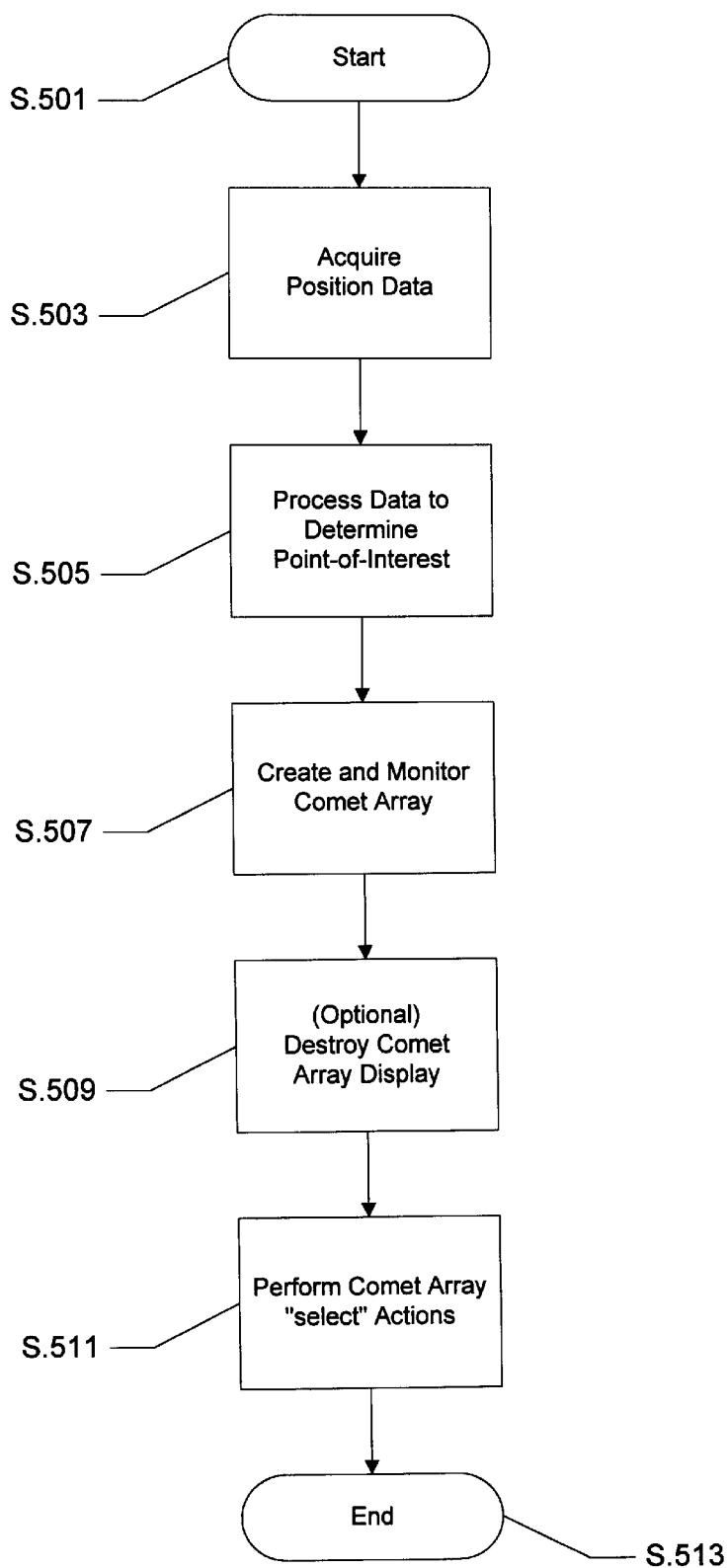
FIG. 5 is an exemplary, high-level flow chart of the various processes and operations that may be performed for creating, using and finally destroying a comet array control, in accordance with an aspect of the invention.

FIG. 5 illustrates an exemplary, high-level flow chart of the various processes and operations that may be performed for creating, using and finally destroying a comet array. As discussed herein, a comet array may comprise one or more comet objects and, accordingly, the routine of FIG. 5 may also be applied when only a single comet is created and utilized. Further, in accordance with an aspect of the invention, the processes and operations of FIG. 5 may be implemented through any suitable combination of hardware, software and/or firmware. For example, the routine of FIG. 5 may be implemented through software running on a computer or microprocessor based host system. The host system may be a host computer system, such as host computer 101 of FIG. 1, or it may be a microprocessor based system or device associated with a display screen and eye-tracking equipment.

The process of FIG. 5 is initialized and started at step S.501. At step S.503, the process acquires or collects the position data. For example, at step S.503 the process may read output from an eye tracker device or eye tracking system. Eye tracker output may be acquired over a computer port, such as a serial port, universal serial bus, parallel port, or any other device that is physically and electrically supported by the host computer or microprocessor based system, such as computer system 101 shown in FIG. 1. Eye tracker output may also be acquired from a device connected directly to the host system bus, such as a video capture card 111 shown in FIG. 1, which itself is connected to a video camera. In either case, the eye-tracking signal may be in the form of an unprocessed video signal, or data that have been pre-processed by a control unit external to the computer. If the data are in the form of unprocessed video signals, a software program, or a program recorded in read-only memory (ROM), may process the video signal to extract the eye and eye features from the overall scene, determine the center of the pupil and at least one Purkinje image (e.g., the first Purkinje image, otherwise known as the corneal reflection (CR), which is the reflection of a light source from the front surface of the cornea), and compute a point-of-gaze vector that intersects the display screen of the host system, such as computer display 121 shown in FIG. 1. This point-of-gaze vector may be expressed in environment coordinates, and units of inches or centimeters, from an arbitrary, but fixed reference point in the environment. The point-of-gaze vector represents the distance (in all three dimensions) of the user's point-of-gaze on the display screen from the reference point. This computation may also rely on the presence of some type of head tracking device, in which case the program must convolve the positional information provided by the tracking device, with the positional information associated with the eye pupil and Purkinje image to determine the point-of-gaze vector.

At step S.505, the user's point-of interest on the screen is determined. For example, at step S.505 the process may convert the eye-tracker point-of-gaze vector, expressed in environment coordinates, to display screen coordinates, expressed in pixels (picture elements) for the specific resolution of the display monitor. The process may further apply various statistical and signal processing algorithms, such as those that are well known to practitioners of the art, to eliminate the high frequency components of the eye-tracking signal in order to produce a smooth stream of point-of-gaze data. For example, using the methodology and models of statistical time series analysis, a simple weighted moving average of the eye-tracker point-of-gaze vector observations may be implemented. Using the methodology and models of digital signal processing, an n-delay finite impulse response (FIR) filter to process the eye-tracker point-of-gaze vector observations may be utilized. At step S.507, the process calls a routine to create and monitor a comet array. In this regard, the various processes and operations illustrated in FIG. 6 may be performed to create a comet array and determine whether a particular comet was selected by a user. At step S.509, the comet array, as a running set of software objects, may be destroyed, or the comet array may be removed from or made invisible on the display screen without destroying the set of software objects, if the using application program or host system no longer wishes to have it displayed. At step S.511, the action set associated with the selected comet is performed. If the result from the routine executed at step S.507 was "fail," meaning no comet in the array was selected, then the host system or using application program is instructed to take one set of actions (e.g., terminating a thread), including no actions at all. If the result from step S.507 was "success" with the index i of the selected comet, then the host system or using application program is instructed to perform the action or actions associated with the selected comet. The comet actions taken by the host system or using application program at step S.507 could be of any type. For example, the actions associated with a particular comet might be to: (i) change the color or movement pattern of the comet to provide feedback to the user that it has been successfully tracked and hence selected by the user; (ii) dismiss or otherwise hide the comet itself so that it is no longer visible on the display; and/or (iii) invoke the primary action or actions for which the comet was initiated in the first place, such as opening a particular file, closing an information (help) display screen, confirming a file save operation, or starting a particular program. The process of FIG. 5 terminates at step S.513.

Figure 6:
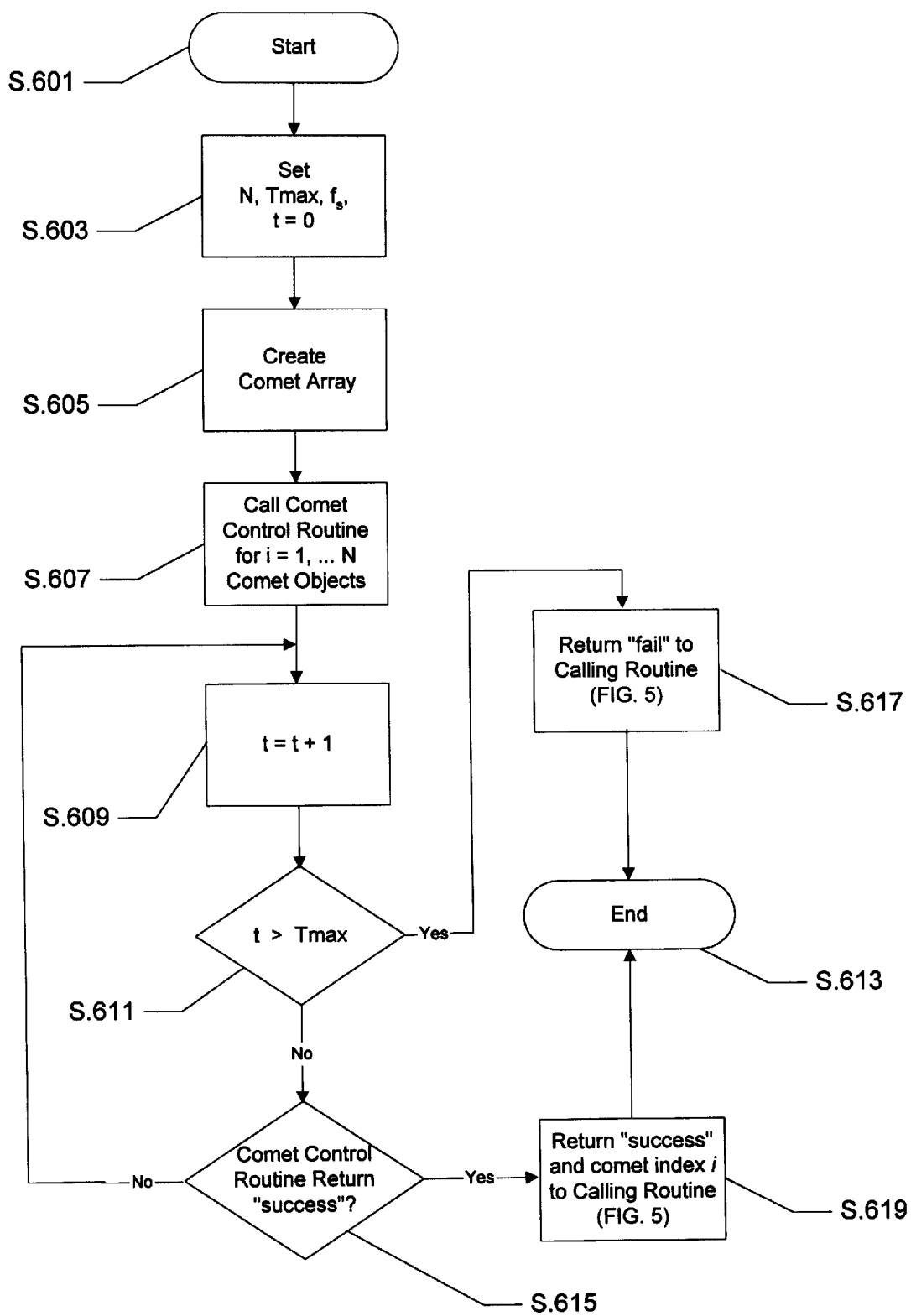
FIG. 6 is an exemplary flow chart, in accordance with an aspect of the invention, of the various processes and operations that may be performed for creating a comet array, and determining whether a particular comet was acquired by the user and subsequently selected.

FIG. 6 illustrates an exemplary flow chart of the various processes and operations that may be performed for creating a comet array, and determining whether a particular comet was acquired by the user and subsequently selected. As discussed above, the routine of FIG. 6 may be executed at step S.507 in the process of FIG. 5. The routine of FIG. 6 may be implemented through any suitable combination of hardware, software and/or firmware, such as software running on a host system.

The routine of FIG. 6 is initialized and started at step S.601. At step S.603, the process initializes several key or main variables. For example, a variable t, denoting the time index, is initialized and set to zero and a variable Tmax, representing the maximum number of samples that will be taken, is initialized. A variable $f_s$, representing the sampling frequency, e.g., 30 times per second (or 30 Hertz), may also be initialized. Further, a variable N, denoting the number of comets in the array to create, is set The choice for the variable N is determined by the number of comets that need to be displayed, which in turn is determined by the number of choices that need to be presented to the user. Generally, N choices will require display of N comets. However, if the choice is a simple binary one, such as "yes" or "no," representing essentially two choices, then a single comet could be displayed that would persist indefinitely until it is successfully tracked by the user, in which case the interpretation is "yes." If it is never tracked, then the interpretation would, by default, be "no." Thus, the relationship between the number of choices and number of comets need not be one-to-one. Choices for the variables Tmax and $f_s$ may be made interdependently, and may be related to the length of time that the user is allowed to acquire a specific comet in the array (including an array consisting of a single comet). For example, if the goal is to allow the user five (5) seconds to acquire a comet, and the sampling period f, is chosen to be thirty (30), then the maximum number of samples Tmax must be one hundred fifty (150). The choice for the variable $f_s$ may be determined experimentally, and may be a function of the speed of the host processor, the speed with which comets are moving along their paths, the specific configurations and sizes of the comet paths, and the extent of other processing tasks that need to be performed on the host computer. For example, given the high processor load imposed by three dimensional graphics or video-based applications, it may not be practical or desirable to sample at a high rate. In general, the higher the sampling frequency, the more time the host processor must devote to correlating the user's point-of-gaze track with the comets' tracks, resulting in less time to accomplish other host processor tasks.

At step S.605, the process constructs N comet software objects of the appropriate type and style as required by the application program. At step S.607, the process calls a comet control routine N times, once for each comet. In this regard, the exemplary comet control routine of FIG. 7 may be executed at step S.607 for creating, displaying and setting into motion each comet, and for determining when the comet has been acquired and tracked by the use. In accordance with a preferred embodiment of the invention, at step S.607 a separate processing thread is implemented for each comet, and an operating system is utilized that supports preemptive multitasking, thereby allowing a coarse grain form of parallel processing to occur. By way of non-limiting example, Microsoft Windows 95, 98 and NT, and the various forms of the UNIX operating system provide preemptive multitasking support. In addition, depending on the total processing requirements of the user application where comets are used, it may be advantageous to use a computer or host system that supports multiple processors to improve overall processing performance. However, not all of the noted operating systems above can make use of multiple processors (Windows NT and some UNIX operating systems can make use of multiple processors). When the process calls the comet control routine (such as the routine in FIG. 7), it may pass as arguments the values of Tmax and $f_s$, which are used in the comet call routine to control the comet's eye acquisition exposure period, i.e., the period of time (=Tmax×$f_s$) in which the comet can be visually acquired. After this period, the comet expires, i.e., tracking it after this period will not cause it to be selected. Normally, the eye acquisition exposure period would be the same for all comets in the array, giving each the same amount of time to be visually tracked. However, there is no reason why these exposure periods could not be set for different times, allowing some comets to expire earlier than others.

At step S.609, the process increments by one (1) the time index t. At step S.611, the process determines whether the maximum number of time periods, Tmax, has been exceeded. If so, at step S.617, the process returns "fail" to the calling routine (e.g, the routine of FIG. 5 at step S.507), and ends at step S.613. If Tmax has not been exceeded, then at a step S.615, the process determines whether a "success" result, arising from the comet control routine (e.g., the comet control routine of FIG. 7), has been received for any of the N comets. On the first "success" result, at a step S.619, the process returns "success" and the index i of the selected comet to the calling routine (e.g., the routine of FIG. 5), and ends at step S.613. If a "success" result has not been received at step S.615, then logic flow proceeds to step S.609 to increment the time index t and determine whether the maximum number of time periods, Tmax has been exceeded at step S.611.

Figure 7:
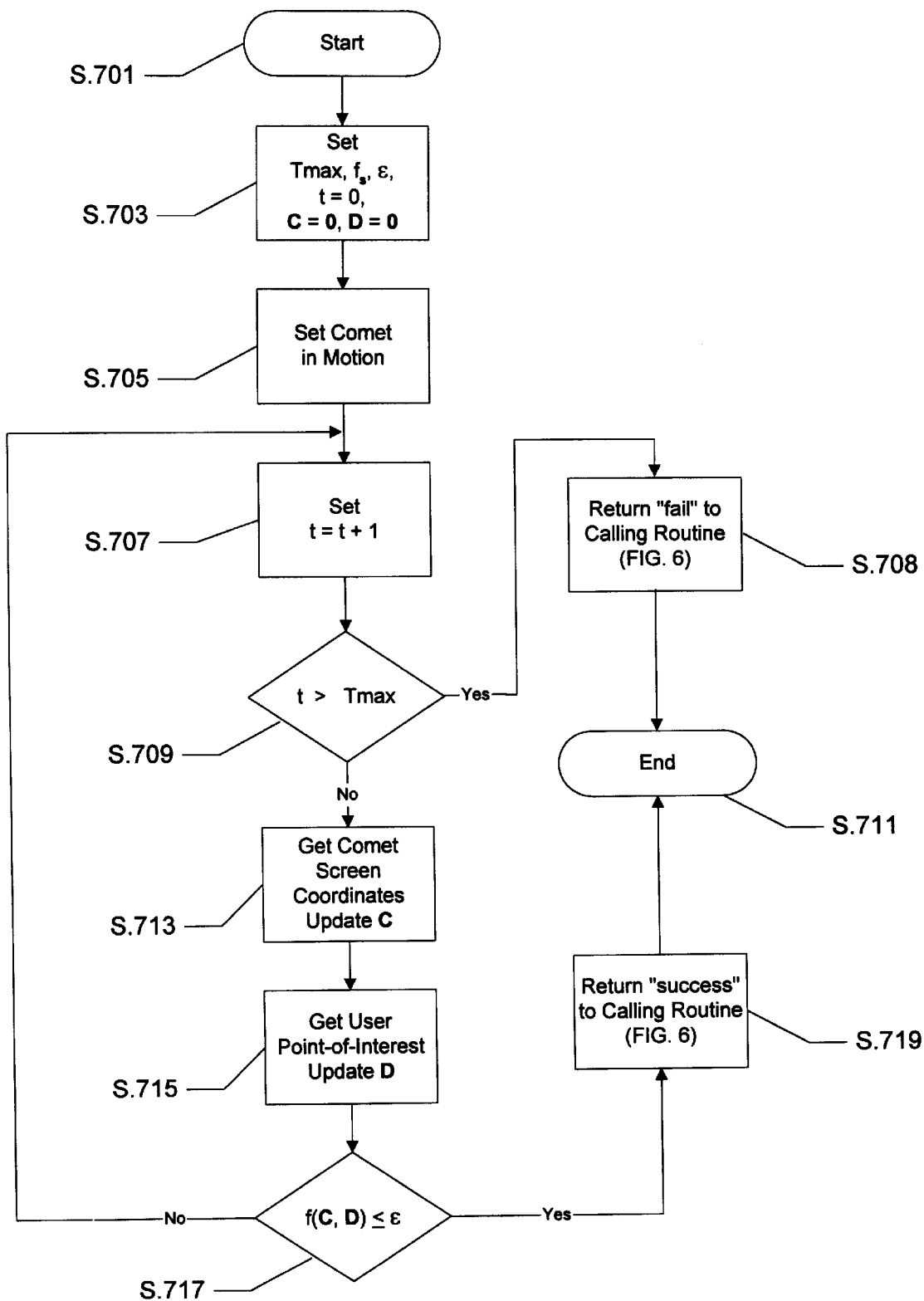
FIG. 7 is an exemplary flow chart of the various processes and operations that may be performed for creating, displaying and setting into motion a single graphical object or comet, and for determining when the comet has been acquired and tracked by the user.

FIG. 7 illustrates an exemplary comet control routine for creating, displaying and setting into motion a single comet graphical object, and for determining when the comet has been acquired and tracked by the user. As discussed above, the routine of FIG. 7 may be executed at step S.615 in the process of FIG. 6. In accordance with an aspect of the invention, the processes and operations of FIG. 7 may be implemented through any suitable combination of hardware, software and/or firmware, such as software residing on a host system.

In the comet control routine of FIG. 7, the basic process involves collecting a number of samples at fixed intervals of time. A sample consists of the location of the comet in screen coordinates at a particular time t, and the location of the user's point-of-gaze at time t. The process starts at step S.701. At step S.703, the process initializes several key variables. Two of these variables, Tmax and $f_s$, may be passed as arguments from the calling routine (i.e., step S.607 in FIG. 6). As explained above, the variables Tmax and $f_s$ are used to control the comet's eye acquisition exposure period, i.e., the period of time (=Tmax×$f_s$) in which the comet can be visually acquired. However, the time period during which the comet can be visually acquired need not be the same as the time period in which the comet is shown on computer display. For example, the comet array can always be displayed, during which time, the routine in FIG. 7 runs repeatedly and continuously. At the end of each eye acquisition exposure period, a new period is started, during which a comet can be chosen (i.e., tracked by the user) or not. At step S.703, other variables may be initialized or set. For example, a variable t, denoting the time index, may be set to zero. Since the invocation of the comet control routine in FIG. 7 occurs nearly simultaneously for all N comet objects in step S.607, the individual values for t will correspond closely to the comet array value for t, which is initialized in step S.603. Thus, all comets in the array will be started at approximately the same time. At step S.703, a predetermined tolerance $\epsilon$ (wherein $\epsilon>0$), representing an allowable error or distance between the comet position and the user's point-of-gaze position, may also be initialized or set. Further, variables C and D, discussed in greater detail below, may also be initialized and set at step S.703.

For each comet, the variable C is initialized and set to zero and comprises a matrix with two columns and Tmax rows to represent the position of the comet over Tmax time periods. The first column of C, denoted by x, comprises the time-indexed values of the horizontal coordinate of the comet in screen pixels, i.e., $$x=[x_1, x_2, \ldots, x_{Tmax}]^T,$$

where T denotes the vector transpose operation. The second column of C, denoted by y, comprises the time-indexed values of the vertical coordinate of the comet in screen pixels, i.e., $$y=[y_1, y_2, \ldots, y_{Tmax}]^T,$$

where T denotes the vector transpose operation.

The variable D is initialized and set to zero and comprises a matrix with two columns and Tmax rows to represent the position of the user's point-of-gaze over Tmax time periods. The first column of D, denoted by u, comprises the time-indexed values of the horizontal coordinate of the user's point-of-gaze in screen pixels, i.e., $$u=[u_1, u_2, \ldots, u_{Tmax}]^T,$$

where T denotes the vector transpose operation. The second column of D, denoted by v, comprises the time-indexed values of the vertical coordinate of the user's point-of-gaze in screen pixels, i.e., $$v=[v_1, v_2, \ldots, v_{Tmax}]^T,$$

where T denotes the vector transpose operation.

At step S.705, the process causes the graphical object representing the comet to be set in motion on the computer display. The particular geometry and appearance of the comet can be of any form, and as shown in FIGS. 4A–4J, there can be any number of comets exposed at any single time and any given comet can follow a variety of track patterns, both in terms of the shape of the track and the general direction of travel. Moreover, a comet need not ever return to its point of origin (specified at time t=0) and its movement could even be random. At step S.707, the process increments by one (1) the time index t. At step S.709, the process determines whether the maximum number of time periods, Tmax, has been exceeded. If so, at step S.708, the process returns a "fail" result to the calling routine (e.g., the routine of FIG. 6 at step S.615). Thereafter, the process ends at step S.711. If the maximum number of time periods has not been exceeded, in step S.713, the process extracts the comet's current position in screen pixel coordinates on the display screen, and updates the matrix C associated with the comet. The update consists of assigning the comet horizontal position to the vector element x[t] for the current time t, and assigning the comet vertical position to the vector element y[t] for the current time t.

Obtaining the current position of a moving graphic object on the display may place a noticeable computational burden on the system processor and the video display rendering hardware. This is particularly true if the comets of the present invention are implemented using three dimensional (3-D) graphics, as the process for determining where a particular comet is at any time may take an extensive calculation. One way to alleviate this computational burden is to use predetermined and generally repeating comet paths that have been produced through a deterministic motion generation process. The process for extracting the comet's current position in a path can be made more efficient by sampling one or more parameters of a deterministic motion generation process at the time index t, and using that (or those) value(s) to perform simple geometric calculations to obtain the comet's screen coordinates. For example, if a specific comet is implemented to follow a circular (i.e., repeating and deterministic) path, and the motion generation process that causes the comet to be rendered on the screen in different locations makes use of a simple angle of rotation, theta, of the comet graphic object, and if the radius of curvature r of the circular path is also known and constant, then the display screen horizontal and vertical coordinates (in three dimensional graphics space) can easily be computed by first applying the cosine and sine functions to the angle of rotation theta, and then multiplying these two results individually by the radius of curvature, r. These results (which are now in three dimensional graphics space) will need to be further converted to horizontal and vertical display pixels by applying a simple linear transformation to the horizontal and vertical coordinates in three dimension graphics space.

At step S.715, the user's point-of-interest is determined and the matrix D is updated. For example, at step S.715 the process may extract the user's current point-of-gaze position in screen coordinates on the computer display, and updates the matrix D. The update consists of assigning the user's point-of-gaze horizontal position in screen pixels to the vector element u[t] for the current time t, and assigning the point-of-gaze vertical position in screen pixels to the vector element v[t] for the current time t. At step S.717, the process determines whether the distance between any displayed comet and the user's point-of-gaze, accumulated over one or more time periods, is sufficiently small to consider the tracks of the comet and the user's point-of-gaze to be the same. The distance is a function of the matrices, C and D, and is denoted as $f(C, D)$. In effect, in this step, the process determines that the user has been tracking one particular comet if the computed distance is less than or equal to the allowed positive distance $\epsilon$ (i.e., $f(C, D) \leq \epsilon$). The distance measure may be computed in any number of ways. One simple approach is to compute the Cartesian distance between the user's point-of-gaze and the comet for each time step, and maintain a moving average of the distance. In a more sophisticated approach, a variety of digital filters that take into account the known movement pattern of a particular comet could be designed and applied. In the case where multiple comets are displayed, various heuristics could be applied to eliminate unlikely candidates and improve performance. For example, if the user's point-of-gaze is exclusively, or almost exclusively in the lower right quadrant of the computer display over some period of time, it would be a good estimate to assume that no comets in the upper right quadrant are being tracked by the user. By applying this type of heuristic, the distance computation can be limited to a few of a plurality of comets, saving computation time. The choice of $\epsilon$ is largely determined empirically, depending on the specifics of the application and the function $f(C, D)$. However, it can be generally stated that as $\epsilon$ approaches zero, comet selection becomes increasingly more difficult, requiring very steady eye tracking. This has the advantage that comets cannot be inadvertently or casually selected. It can also be generally stated that as $\epsilon$ becomes quite large (approaching infinity in the limit), comet selection becomes increasingly easy to do, and even very poor eye tracking will produce a selection result. Hence, the tradeoff is between comet robustness and responsiveness.

Referring again to FIG. 7, if it is determined at step S.717 that $f(C, D) \leq \epsilon$, then at step S.719 the process returns a "success" result to the calling routine (e.g., the routine of FIG. 6 at step S.615). If a plurality of comets or a comet array is present, then at step S.719 the process may also return a result including an index i or provide some other form of notification (such as a window message) to indicate the selected comet to the calling routine. Alternatively, the calling routine (e.g., the routine of FIG. 6) may determine which comet was selected based on the processing thread (created at step S.607) that responded with the "success" result. Following step S.719, the process ends at a step S.711. If, however, it is determined at step S.717 that the relationship $f(C, D) \leq \epsilon$ is not satisfied, then the process returns to step S.707 to increment the time index t and determine whether the maximum number of time periods, Tmax has been exceeded at step S.709.

In the above-described embodiments of the invention it is disclosed that the comet array might be destroyed if no single comet is selected during the eye acquisition exposure period. In accordance with another aspect of the invention, it is also possible that the comet array is not destroyed until the application program using the comets array is closed itself. For example, a comet array could be first exposed in an Internet browser application when it is started, remain visible throughout the browser's use, and only be destroyed when the user closes the browser program.

In the description provided above, the invention has been described with reference to utilizing a user's eye point-of-gaze as data to indicate point-of-interest. The present invention, however, is not limited to using point-of-gaze data to determine a user's point-of-interest or selection of a comet. Other types of eye direction data or point-of-interest data may be utilized for the same purpose. For example, the invention can be implemented with any device that is capable of conveying the user's point-of-interest on a display screen, such as the display device 121 in the embodiment of FIG. 1. Exemplary devices include conventional mice, remote mice, trackballs, forceballs, light pens, joysticks, head pointing devices, assistive devices for persons with disabilities, and gesture devices such as data gloves, all of which can be used to control the position of a cursor, whether shown as visible or not, on a display of a host computer or microprocessor-based system or device. All these exemplary devices can produce output that is suitable for controlling a cursor on a display screen and all can be interfaced, for example, to the host computer 121 in FIG. 1 through the various I/O ports 123 or through adapter cards that attach to the host computer bus 103. In addition, the disclosed routines of FIGS. 5–7 may be adapted or suitably modified to handle input from any one of these exemplary devices. For example, if the user moves a conventional mouse around to indicate point-of-interest on the display, the algorithms at step S.505 of FIG. 5 may simply make an operating system call to obtain the current cursor coordinates. Step S.503 can therefore be implemented as reading output from one of these exemplary devices as opposed to reading output from an eye tracker device or eye tracking system. Further, steps S.715 and S.717 of FIG. 7 could be modified so that the determination of whether a particular comet is being tracked is performed based on cursor movement data provided from one of the exemplary devices. In such a case, matrix D would be updated so as to contain the cursor position in screen coordinates on the display screen. As a result, a comet could be selected when it is determined that there is a correspondence between the direction of movement of a comet and the direction of movement of an input device. For instance, a user could Page Up, Page Down, or Close the text screen in FIG. 3C by tracking movement of the appropriate comet through movement of an input device, such as a conventional mouse device. Therefore, in an implementation of the invention that does not make use of eye tracking input, the user may move a conventional mouse, a trackball, a joystick, a data glove, etc. in order to track the movement of any one or a plurality of comets, which produces the same effect as if the system had been configured with an eye-tracking device.

While the invention has been described with reference to several exemplary embodiments, it is understood that the words which have been used herein are words of description and illustration, rather than words of limitations. Changes may be made without departing from the scope and spirit of the invention and its various aspects. Although the invention has been described herein with reference to particular means, materials and embodiments, the invention is not intended to be limited to the particulars disclosed herein; rather, the invention extends to all functionally equivalent structures, methods and uses.

What is claimed is:

1. An eye gaze interaction system for controlling an interface of a host system, said eye gaze interaction system comprising:
    a display screen that displays at least one graphical object, each said graphical object being displayed in motion on said display screen, each said graphical object being associated with at least one predetermined action to be performed by said host system;
    an eye tracking system that detects eye point-of-gaze data of a user's eye over a predetermined time period;
    means for detecting a correspondence between a direction of movement of said graphical object on said display screen and a direction of movement of the user's eye based on said eye point-of-gaze data detected by said eye tracking system; and
    means for causing said host system to perform said predetermined action when said detecting means detects a correspondence between the direction of movement of said graphical object and the direction of movement of the user's eye.

2. An eye gaze interaction system according to claim 1, wherein said detecting means comprises means for determining a distance between the direction of movement of said graphical object on said display screen and the direction of movement of the user's eye, said detecting means detecting that a correspondence exists between the direction of movement of said graphical object and the direction of movement of the user's eye when the distance determined by said determining means is within a predetermined tolerance $\epsilon$.

3. An eye gaze interaction system according to claim 1, wherein said graphical object is displayed in motion on said display screen so as to follow a predefined path on said display screen.

4. An eye gaze interaction system according to claim 1, further comprising means for removing each said graphical object from said display screen if a correspondence between the direction of movement of said graphical object and the direction of movement of the user's eye is not detected by said detecting means.

5. An eye gaze interaction system according to claim 1, wherein a plurality of graphical objects are displayed in motion on said display screen, each of said plurality of graphical objects being associated with a predetermined action to be performed by said host system.

6. An eye gaze interaction system according to claim 5, wherein said detecting means detects whether a correspondence exists between a direction of movement of any one of said plurality of graphical objects on said display screen and a direction of movement of the user's eye based on said eye point-of-gaze data detected by said eye tracking system, such that when said detecting means detects that a direction of movement of a selected one of said plurality of graphical objects corresponds to the direction of movement of the user's eye, said causing means causes said host system to perform a predetermined action associated with said selected one of said plurality of graphical objects.

7. A method for eye gaze control for selecting a graphical object displayed in motion on a display screen, said method comprising:
  displaying at least one graphical object in motion on said display screen;
  collecting eye point-of-gaze data of a user's eye over a predetermined time period;
  detecting a correspondence between a direction of movement of said graphical object on said display screen and a direction of movement of the user's eye based on said eye point-of-gaze data; and
  selecting said graphical object on said display screen when a correspondence is detected between the direction of movement of said graphical object and the direction of movement of the user's eye.

8. A method for eye gaze control according to claim 7, wherein each said graphical object is associated with a predetermined action to be performed by a host system, said method further comprising causing said host system to perform said predetermined action when said graphical object is selected based on the detected correspondence between the direction of movement of said graphical object and the direction of movement of the user's eye.

9. A method for eye gaze control according to claim 7, wherein said method further comprises determining a distance between the direction of movement of said graphical object on said display screen and the direction of movement of the user's eye, and detecting that a correspondence exists between the direction of movement of said graphical object and the direction of movement of the user's eye when the distance is within a predetermined tolerance $\epsilon$.

10. A method for eye gaze control according to claim 7, wherein said method further comprises displaying said graphical object on said display screen so as to follow a predefined path.

11. A method for eye gaze control according to claim 7, said method further comprising removing said graphical object from said display screen if a correspondence between the direction of movement of said graphical object and the direction of movement of the user's eye is not detected.

12. A method for eye gaze control according to claim 7, said method further comprising displaying a plurality of graphical objects in motion on said display screen, each of said plurality of graphical objects being associated with a predetermined action to be performed by a host system.

13. A method for eye gaze control according to claim 12, said method further comprising detecting whether a correspondence exists between a direction of movement of any one of said plurality of graphical objects on said display screen and a direction of movement of the user's eye based on said eye point-of-gaze data, and selecting the first of said plurality of graphical objects that is detected as having a direction of movement that corresponds to the movement of the user's eye.

14. A computer program embodied on computer readable medium for eye gaze interaction and control of a host system, comprising:
  first computer readable program code means for causing a display screen of said host system to display at least one graphical object, each said graphical object being displayed in motion on said display screen, each said graphical object being associated with a predetermined action to be performed by said host system;
  second computer readable program code means for collecting, from an eye tracking system, eye direction data of a user's eye over a predetermined time period;
  third computer readable program code means for detecting a correspondence between a direction of movement of said graphical object on said display screen and a direction of movement of the user's eye based on said eye direction data; and
  fourth computer readable program code means for causing said host system to perform said predetermined action when a correspondence is detected between the direction of movement of said graphical object and the direction of movement of the user's eye.

15. A computer program embodied on a computer readable medium according to claim 14, wherein said third computer readable program code means comprises a source code segment that determines a distance between the direction of movement of said graphical object on said display screen and the direction of movement of the user's eye, said third computer readable program code means detecting that a correspondence exists between the direction of movement of said graphical object and the direction of movement of the user's eye when the distance is determined to be within a predetermined tolerance $\epsilon$.

16. A computer program embodied on a computer readable medium according to claim 14, wherein said first computer readable program code means causes said graphical object to be displayed in motion on said display screen so as to follow a predefined path on said display screen.

17. A computer program embodied on a computer readable medium according to claim 14, further comprising fifth computer readable program code means for causing said graphical object to be removed from said display screen if a correspondence between the direction of movement of said graphical object and the direction of movement of the user's eye is not detected.

18. A computer program embodied on a computer readable medium according to claim 14, wherein said first computer readable program code means causes a plurality of graphical objects to be displayed in motion on said display screen, each of said plurality of graphical objects being associated with a predetermined action to be performed by said host system.

19. A computer program embodied on a computer readable medium according to claim 18, wherein said third computer readable program code means detects whether a correspondence exists between a direction of movement of any one of said plurality of graphical objects on said display screen and a direction of movement of the user's eye based on said eye direction data, such that when a direction of movement of a selected one of said plurality of graphical objects is detected to correspond to the direction of movement of the users eye, said fourth computer readable program code means causes said host system to perform a predetermined action associated with said selected one of said plurality of graphical objects.

20. A computer program embodied on a computer readable medium according to claim 14, wherein said eye direction data collected by said second computer readable program code means from said eye tracking system comprises eye point-of-gaze data.

21. A method for selecting a graphical object displayed in motion on a display screen, said method comprising:

displaying at least one graphical object in motion on said display screen;

collecting point-of-interest data from a movable input device controlled by a user over a predetermined time period;

detecting a correspondence between a direction of movement of said graphical object on said display screen and a direction of movement of said input device based on said point-of-interest data; and selecting said graphical object on said display screen when a correspondence is detected between the direction of movement of said graphical object and the direction of movement of said input device.

22. A method for selecting a graphical object according to claim 21, wherein each said graphical object is associated with a predetermined action to be performed by a host system, said method further comprising causing said host system to perform said predetermined action when said graphical object is selected based on the detected correspondence between the direction of movement of said graphical object and the direction of movement of said input device.

23. A method for selecting a graphical object according to claim 21, wherein said method further comprises determining a distance between the direction of movement of said graphical object on said display screen and the direction of movement of said input device, and detecting that a correspondence exists between the direction of movement of said graphical object and the direction of movement of said input device when the distance is within a predetermined tolerance $\epsilon$.

24. A method for selecting a graphical object according to claim 21, said method further comprising removing said graphical object from said display screen if a correspondence between the direction of movement of said graphical object and the direction of movement of said input device is not detected.

* * * * *